United States Patent [19]

Nunogaki et al.

[11] Patent Number: 5,086,210
[45] Date of Patent: Feb. 4, 1992

[54] $Mo_5Si_3C$ CERAMIC MATERIAL AND GLOW PLUG HEATING ELEMENT MADE OF THE SAME

[75] Inventors: Naochika Nunogaki, Kariya; Tetuo Toyama, Anjo; Nobuei Ito, Okazaki, all of Japan

[73] Assignees: Nippondenso Co., Ltd., Kariya; Nippon Soken, Inc., Nishio, both of Japan

[21] Appl. No.: 329,616

[22] Filed: Mar. 28, 1989

[30] Foreign Application Priority Data

Mar. 29, 1988 [JP] Japan .................. 63-75551

[51] Int. Cl.$^5$ .................. C04B 35/58; H05B 3/10; F02P 19/02
[52] U.S. Cl. .................. 219/270; 123/145 A; 219/553; 252/513; 252/516; 361/266
[58] Field of Search .................. 219/260-270, 219/544, 552, 553; 361/266; 123/145 R, 145 A; 252/513, 516

[56] References Cited

U.S. PATENT DOCUMENTS 4,613,455 9/1986 Suzuki et al. .
4,634,837 1/1987 Ito et al. .

FOREIGN PATENT DOCUMENTS 59-231321 12/1984 Japan .
60-28193 2/1985 Japan .

OTHER PUBLICATIONS

Proceedings of the 10th Plansee-Seminar 1981, vol. 1, Ed. H. M. Ortner, Metallwerk Plansee, Reutte, Austria, Van Loo et al., "Phase Relations and Diffusion Paths in the Mo-Si-C System at 1200° C.", p. 146, Table I; FIG. 3.

Primary Examiner—Anthony Bartis
Attorney, Agent, or Firm—Cushman, Darby & Cushman

[57] ABSTRACT

An electrically conductive ceramic material containing at least 20 wt % of $Mo_5 Si_3 C$ and having a resistance-temperature coefficient no greater than $5 \times 10^{-4}$ deg$^{-1}$ is used to make the heating element of a self-controlling type glow plug having a resistor with a larger temperature-resistance coefficient, such as iron or nickel, connected in series to the heating element for controlling the supply of electric current to the heating element. The ceramic material is made by firing a ceramic powder mixture of Mo and Si mixed with carbon black.

13 Claims, 2 Drawing Sheets

$Mo_5Si_3C$ CERAMIC MATERIAL AND GLOW PLUG HEATING ELEMENT MADE OF THE SAME

BACKGROUND OF THE INVENTION

1. Field of the Invention

The present invention relates to a ceramic material with a small resistance-temperature coefficient, and, more particularly, to a ceramic material which can be effectively used to serve as the heating element of a self-controlling type glow plug.

2. Description of the Related Art

Hitherto, ceramic heating elements have been prepared by combining and dispersing electrically conductive ceramics such as TiN and $MoSi_2$ and insulating type ceramics such as $Si_3N_4$ and sintering these combined ceramics.

However, a sufficiently reduced resistance temperature coefficient could not be obtained in a ceramic heating element of such a type as described above, because attempts to reduce the resistance-temperature coefficient meet inherent limitations due to usual influence of the specific temperature-resistance coefficient of electrically conductive ceramics such as TiN and $MoSi_2$.

For example, a known self-controlling type glow plug is provided with the above-described type ceramic heating element and a resistor for controlling electric current connected in series to said element.

Since the resistance-temperature coefficient of the element cannot be sufficiently reduced, the heating element itself acts as the resistor when the temperature of the heating element is raised, the amount of electric current to be supplied to the heating element cannot be controlled properly with the resistor for controlling electric current, and satisfactory temperature-rising characteristics cannot be obtained.

SUMMARY OF THE INVENTION

An object of the present invention is to provide an electrically conductive ceramic material of an extremely reduced resistance-temperature coefficient, and as well to obtain a self-controlling type glow plug exhibiting excellent temperature-rising characteristics.

According to the present invention, an electrically conductive ceramic material is disclosed which has at least 20% $Mo_5Si_3C$ by weight the remaining ceramic materials as insulating ceramics which are one of $Si_3N_4$, $Al_2O_3$, AlN or $ZrO_2$. Another aspect of the invention uses the same material having a resistance-temperature coefficient of $5 \times 10^{-4}$/degree. This same material can also be sued for forming a flow plug wherein a resistor for controlling the supply of electric current to a heating element is connected in series to the heating element.

The heating element has a smaller resistance-temperature coefficient (not greater than $5 \times 10^{-4}$ deg$^{-1}$) than that of the resistor. The invention also includes a process for producing an electrically conductive ceramic material. This process starts with a ceramic powder of $Mo_5Si_3$ particles and at least 0.5wt % of carbon black. The powder is fired to produce a ceramic material including sufficient $Mo_5Si_3C$ to reduce the resistance-temperature coefficient to no greater than $5 \times 10^{-4}$ deg$^{-1}$. This powder preferably has at least 20 wt % $Mo_5Si_3C$. Alternately, a ceramic material of fine particles of Mo, fine particles of Si and at least 0.5wt % carbon black can be used.

DESCRIPTION OF THE PREFERRED EMBODIMENTS

Figure 1:
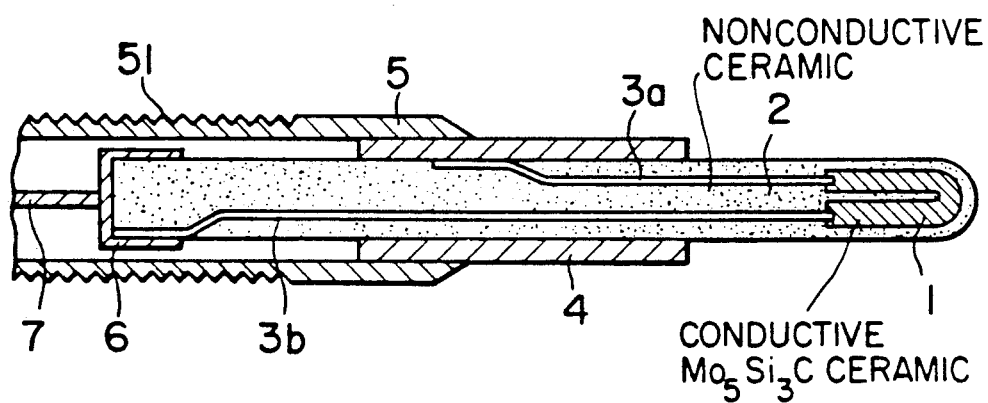
FIG. 1 is a cross-sectional view illustrating a glow plug according to one embodiment of the present invention.

Since $Mo_5Si_3$ proposed as the conventional electrically conductive ceramic material contains an excessive amount of Mo atoms, its resistance-temperature coefficient cannot be sufficiently reduced. Furthermore, since $MoSi_2$ contains an excessive amount of Si atoms in which the ratio of Mo atoms is smaller than in $Mo_5Si_3$, the resistance-temperature coefficient cannot be reduced sufficiently.

The present inventors have found that $Mo_5Si_3C$ can serve as a ceramic material exhibiting a sufficiently reduced resistance-temperature coefficient.

The present invention employs $Mo_5Si_3C$ as electrically conductive ceramic material wherein $Mo_5Si_3C$ can be expressed more accurately by the formula $Mo_{5-x}Si_3C_{1-Y}(0 \leq X \leq 2, 0 \leq Y < 1)$. The reason why X is 2 or less lies in that the two atoms of the five Mo atoms can easily give rise to lattice defects. Furthermore, the reason why Y is smaller than 1 also lies in that C atom can easily give rise to lattice defects. Since the normal case in which no lattice defects are generated can be realized with a composition expressed by $Mo_5Si_3C$, the "$Mo_5Si_3C$" will be used hereinafter for the above-described formula.

A sufficiently reduced resistance-temperature coefficient can be obtained with $Mo_5Si_3C$ since the content of Mo atoms in $Mo_5Si_3C$ is smaller than that in $Mo_5Si_3$, that is, the content of Mo atoms is not excessive, and the content of Si atoms in $Mo_5Si_3C$ is smaller than that in $MoSi_2$, that is, the content of the Si atoms is not excessive.

Furthermore, a self-controlling type glow plug exhibiting an excellent temperature-rising characteristics can be obtained by using this ceramic material as the heating element. That is, the resistance of the heating element can be made sufficiently larger than the resistance of the resistor at the initial stage of the electricity supply to the glow plug. On the other hand, the resistance of the heating element can be made smaller than the resistance of the resistor at the time when the electricity supply to the same is controlled, causing the heating rate of the heating element to be increased and an excessive rise in the temperature of this heating element to be prevented.

EXAMPLE 1

A method of preparing $Mo_5Si_3C$ will now be described.

As shown in Table 1, 0.5 to 3.0 wt % of carbon black was added to $Mo_5Si_3$ powder having a mean particle size of 1 μm, and then they were mixed and pulverized in a ball mill. The thus-obtained material was sintered in a hot press at 1700° C. for 60 minutes under a pressure of 300 kg/cm$^2$ in an atmosphere of Ar at 1 atm. Thus, a ceramic body was prepared. The obtained ceramic bodies with the compositions of $Mo_5Si_3C$ of samples 1 to 6 were heated up to 900° C. under vacuum. Then, the volume resistivity of each of the samples was obtained by a 4-terminal method, and the change rate with respect to the volume resistivity at room temperature was obtained.

The results are shown in Table 1. In addition, the results of some samples obtained by sintering $MoSi_2$, TiN, and $Mo_5Si_3$ under the same conditions are also shown in Table 1 as comparative examples.

TABLE 1

|  |  | Amount of carbon black added (wt %) | Resistance-temperature coefficient ($\times 10^{-4}$deg$^{-1}$) |
|---|---|---|---|
| Sample | 1 | 0.5 | 10.3 |
|  | 2 | 1.0 | 7.10 |
|  | 3 | 1.5 | 4.80 |
|  | 4 | 2.0 | 3.21 |
|  | 5 | 2.5 | 3.44 |
|  | 6 | 3.0 | 3.38 |
| Comparative | 1 | $MoSi_2$ | 64.2 |
| Example | 2 | TiN | 25.3 |
|  | 3 | $Mo_5Si_3$ | 14.1 |

As is seen from Table 1, as the quantity of the carbon black added to $Mo_5Si_3$ increases, a quantity of $Mo_5Si_3C$ having the completely different structure from $Mo_5Si_3$ increases in the burned ceramic. As a result, a further smaller resistance temperature coefficient than the smallest resistance temperature coefficient ever realized by the $Mo_5Si_3$ conventionally used was obtained. Furthermore, when the carbon black was added in a quantity exceeding 2.0 wt %, $Mo_5Si_3$ was substantially converted to $Mo_5Si_3C$, causing a satisfactory stable resistance-temperature coefficient. The thus obtained stable resistance-temperature coefficient of the electrically conductive ceramic material had a sufficiently reduced value which was substantially 1/5 to 1/20 of the resistance-temperature coefficient obtained by the electrically conductive ceramic materials according to the Comparative Examples 1 to 3.

Although $Mo_5Si_3C$ was obtained by adding carbon black to the starting material $Mo_5Si_3$ in the embodiment above, the present invention should not be limited to this embodiment. For example, a similar effect can be obtained from a material obtained by mixing Mo fine particles, Si fine particles, and carbon fine particles at a predetermined proportion.

EXAMPLE 2

Next, a ceramic heater was manufactured by using the electrically conductive ceramic $Mo_5Si_3C$.

In order to realize the atomic ratio of $Mo_5Si_3C$. = 5:3:1, $Mo_5Si_3$ having a mean particle size of 1 μm and carbon black were mixed, and the thus mixed powder and $Si_3N_4$ having a mean particle size of 10 μm or 1 μm were mixed in order to realize $Si_3N_4:Mo_5Si_3C = 20$ to 80:80 to 20. Then, the material to which each 5 wt % of $Y_2O_3$ and $Al_2O_3$ were added as a sintering aid was wet-mixed for 12 hours in a ball mill. As a solvent, ethanol was used. The thus mixed powder was sintered in a hot-press at 1700° C. for 60 minutes under a pressure of 300 kg/cm$^2$ and in an atmosphere of Ar at 1 atm.

The thus obtained samples 7 to 13 were subjected to measurements of resistivity and change rate of resistance as shown in Example 1. The results are shown in Table 2. In addition, the bending strength of these samples is also shown.

TABLE 2

|  |  | Composition | Mean particle size of $Si_3N_4$ | Resistivity (Ω · cm) | Resistance-temperature coefficient ($\times 10^{-4}$deg$^{-1}$) | σ (kg/ml) |
|---|---|---|---|---|---|---|
| Sample | 7 | $Si_3N_4$-80$Mo_5Si_3C$ | $D_{50} = 1$ μm | $8.7 \times 10^{-4}$ | 1.19 | 25 |
|  | 8 | $Si_3N_4$-70$Mo_5Si_3C$ | $D_{50} = 1$ μm | $2.2 \times 10^{-3}$ | 1.22 | 37 |
|  | 9 | $Si_3N_4$-60$Mo_5Si_3C$ | $D_{50} = 1$ μm | $1.3 \times 10^{-2}$ | 1.24 | 44 |
|  | 10 | $Si_3N_4$-50$Mo_5Si_3C$ | $D_{50} = 10$ μm | $3.1 \times 10^{-4}$ | 1.29 | 55 |
|  | 11 | $Si_3N_4$-40$Mo_5Si_3C$ | $D_{50} = 10$ μm | $9.6 \times 10^{-4}$ | 1.31 | 67 |
|  | 12 | $Si_3N_4$-30$Mo_5Si_3C$ | $D_{50} = 10$ μm | $3.2 \times 10^{-3}$ | 1.24 | 75 |
|  | 13 | $Si_3N_4$-20$Mo_5Si_3C$ | $D_{50} = 10$ μm | $2.3 \times 10^{-1}$ | 1.21 | 78 |
| Comparative | 4 | $Si_3N_4$-30$MoSi_2$ | $D_{50} = 10$ μm | $2.5 \times 10^{-2}$ | 30.02 | 77 |
| Example | 5 | $Si_3N_4$-70$MoSi_2$ | $D_{50} = 1$ μm | $1.9 \times 10^{-3}$ | 10.50 | 46 |

Furthermore, the characteristics of the ceramic heaters formed by $Si_3N_4$ and $MoSi_2$ are respectively shown as Comparative Examples 4 to 5.

As is seen from Table 2, a sufficiently reduced resistance-temperature coefficient is obtained, as compared with the use of $MoSi_2$. A resistance-temperature coefficient of $5.0 \times 10^{-4}$ deg$^{-1}$ or less was realized in the electrically conductive ceramic material by dispersing $Mo_5Si_3C$ serving as the electrically conductive ceramic material in $Si_3N_4$ serving as the insulating ceramic material and by simultaneously sintering the thus dispersed materials. Furthermore, a ceramic for a heater having a desired resistivity with the thus realized low resistance-temperature coefficient maintained was obtained.

Although $Si_3N_4$ was used as the insulating ceramic material, the present invention should not be limited to the example above. All materials having an insulating property may be used in the present invention. Therefore, for example, $Al_2O_3$, AlN, and $ZrO_2$ can realize the similar effects.

EXAMPLE 3

FIG. 1 is a cross-sectional view illustrating a glow plug in which the electrically conductive ceramic material according to the present invention is employed.

As shown in FIG. 1, this glow plug has such a structure that heater 1 of a U-shaped cross section is formed within the end of support member 2 having a circular cross-sectional shape. Furthermore, the support member 2 is provided with electrically conductive wires 3a and 3b of tungsten embedded therein, of which the ends are connected to the heater 1. Metallic pipe 4 is attached around the support member 2, and the end of metallic housing 5 in a cylinder form is connected to the metallic pipe 4. The other end of the electrically conductive wire 3b a extends to the base portion of the support member 2 and is connected to metallic cap 6 installed around this base portion, so that the electrically conductive wire 3b is connected to a power source (omitted from illustration) via this metallic cap 6 and nickel wire 7. On the other hand, the other end of the electrically conductive wire 3a is connected to a metallic sleeve.

The support member 2 and the metallic pipe 4 were coupled by applying nickel plating to the surface thereof and performing blazing of the plated surface. The pipe 4 and the housing 5 were coupled by blazing.

The composition of the material for the heater 1 consisted of 70 wt % of $Si_3N_4$ having a mean particle size of 10 μm and 30 wt % of $Mo_5Si_3C$ having a mean particle size of 1 μm. The composition of the material for the support member 2 consisted of 72 wt % of $Si_3N_4$ having a mean particle size of 1 μm and 28 wt %, of $MoSi_2$ having a mean particle size of 1 μm. As a sintering aid, $Y_2O_3$ and $Al_2O_3$ were added in each amount of 5wt %. In this example, the composition of the material for the support member 2 was arranged in such a manner that the thermal expansion coefficient of the material of the support member 2 and that of the heater 1 became the same.

By virtue of employment of an $Si_3N_4$ powder having a mean particle size of 10 μm for the material of the heater 1, $Mo_5Si_3C$ particles surrounded the $Si_3N_4$ particles, so that the $Mo_5Si_3C$ particles were provided in a continuous manner as electrically conductive structure. Furthermore, by virtue of employment of $Si_3N_4$ particles having a mean particle size of 1 μm as the material for the support member 2, the electrically conductive $MoSi_2$ particles were surrounded by the insulating $Si_3N_4$ particles, so that the former were separated from one another. As a result, an electrically insulated structure was formed.

The reason why $Si_3N_4$ having a mean particle size of 10 μm was used as the material of the heater 1 lies in that reduction in coefficient of thermal expansion and improvement in bending strength are intended by reducing, as described in Example 2, the quantity of $Mo_5Si_3C$ which needs to be provided for the purpose of obtaining the desired resistivity.

The reason why the $MoSi_2$ particles are dispersed in the material for the support member 2 lies in that the thermal stress which will be generated between the material for the heater 1 and that for this support member 2 is intended to be reduced by making its coefficient of thermal expansion equal to that of the material of the heater 1.

Figure 2:
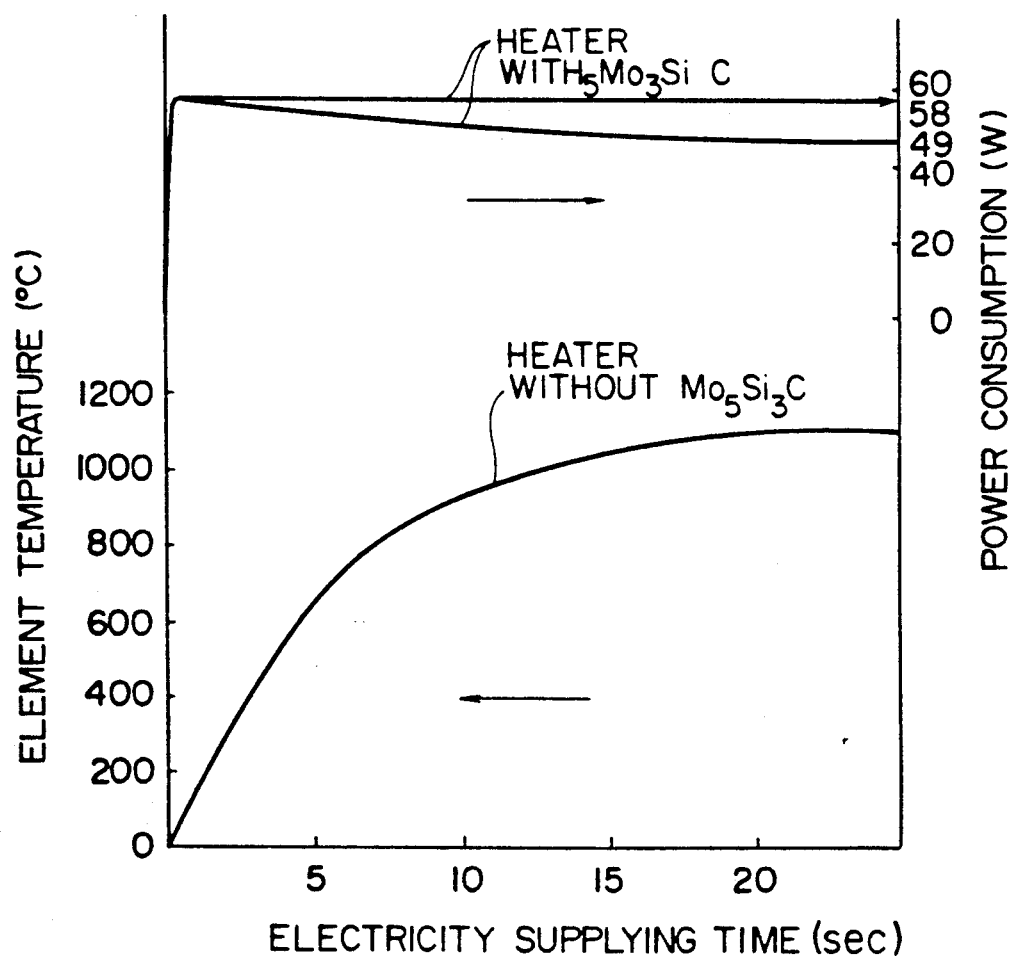
FIG. 2 is a graph showing the electricity supplying characteristics of the glow plug of FIG. 1.

FIG. 2 is a graph which illustrates an electric supplying characteristics of this ceramic heater.

As is seen from FIG. 2, since the heater 1 containing $Mo_5Si_3C$ was used, excellent characteristics for a constant electricity consumption type glow plug could be obtained having a satisfactory reduced resistance temperature coefficient realized in the material for the heater 1.

The structure of the glow plug is not limited to that employed in this example. Any ceramic heaters containing at least electrically conductive ceramic material $Mo_5Si_3C$ may be employed.

Although the ceramic heater can be obtained by mixing the electrically conductive ceramic material comprising $Mo_5Si_3C$ and the insulating ceramic material, the electrically conductive ceramic material according to the present invention can be used for many other purposes, for example, it may be used in a resistor employed as a multilayered substrate or in wiring on substrates.

EXAMPLE 4

Figure 3:
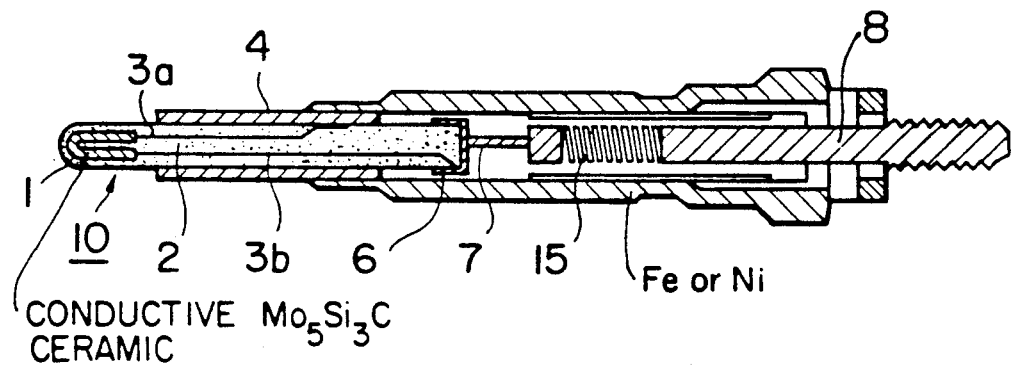
FIG. 3 is a cross-sectional view illustrating another glow plug according to the present invention.

The self-controlling type glow plug according to the present invention is schematically shown in FIG. 3. To the components in FIG. 3 are given the same reference numerals as shown in FIG. 1.

Reference numeral 10 represents a ceramic element. The ceramic element 10 is structured in such a manner that heater 1 serving as the heating portion and electrodes 3a and 3b are formed therein, as shown in Example 3.

The electrode 3a disposed within this ceramic element 10 is electrically connected to housing 5 via sleeve 4. On the other hand, the electrode 3b is electrically connected to second resistor 15 via cap 6 and lead wire 7. The other end of the resistor 15 is connected to electrode 8. This resistor 15 is made of a material with a larger resistance-temperature coefficient than that of the heater 1, for example, it is made of Fe or Ni.

Figure 4:
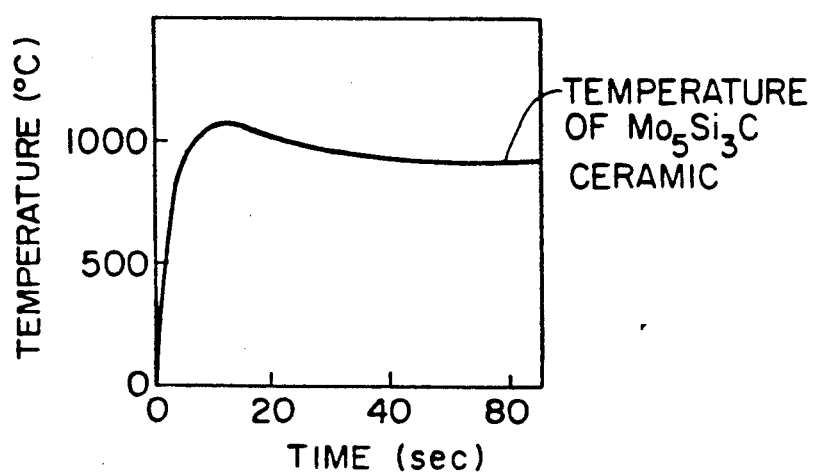
FIG. 4 is a graph illustrating the temperature rising characteristics of the glow plug of FIG. 3.

Then, the operation of this self-controlling type glow plug will be described with reference to FIG. 4.

When the self-controlling type glow plug according to this example is heated by applying an electricity thereto, the temperature of the heater 1 is rapidly raised at the initial stage of the electricity supply since the resistance of the heater 1 is sufficiently larger than that of the resistor 15. However, as is seen from FIG. 4, the resistance of the resistor 15 becomes, in 40 seconds after the start of electricity supply, sufficiently larger than that of the heater 1, and an excessive supply of electricity to the heater 1 is prevented and the overheat of the heater 1 can be effectively prevented.

Furthermore, the R.T. coefficient (ratio of a resistance at 900° C. and that at 20° C.) of the heating portion of the self-controlling type glow plug according to this example can be improved to be substantially 1.20, as compared with substantially 1.69 achieved by a glow plug in which a metallic heating element (tungsten-rhenium) is embedded therein. Therefore, a self-controlling type glow plug exhibiting an excellent temperature rising characteristics is obtained, whereby time taken for the heating portion to rise to 900° C. is significantly shortened from conventional value of 4.0 seconds to 3.0 seconds.

While the above examples have given the ratios in wt %, those of skill in the art understand that a simple reference to the periodic table of elements and/or element descriptions will readily enable a conversion to vol %. The above descriptions give the lower limit of $Mo_5Si_3C$ as being 20 wt %. That is, the weight ratio of $Mo_5Si_3C$ to $Si_3N_4$ must be at least 20/80. Using standard chemical tables or knowledge, it can be found that the density of $Si_3N_4$ is 3.2 grams per cubic centimeter and of $Mo_5Si_3C$ is 8.6 grams per cubic centimeter.

Conversion to volume of $Si_3N_4$: 80 /3.2=25
Conversion to volume of $Mo_5Si_3C$: 20 /8.6=2.32
Volume percentage of $Si_3N_4$ : $25 \times 100/(25+2.32)=91.5$ vol %
Volume percentage of $Mo_5Si_3C$: $2.32 \times 100/(25+2.32)=8.5$ vol %

Therefore, the $Si_3N_4$:$Mo_5Si_3C$ weight ratio of 80:20 above corresponds to a volume ratio of 91.5:8.5. That is, the lower limit of $Mo_5Si_3C$ is 8.5 vol %.

According to the present invention, a ceramic material exhibiting a sufficiently reduced resistance-temperature coefficient can be obtained by using $Mo_5Si_3C$ as the electrically conductive ceramic material.

Furthermore, a self-controlling type glow plug structured by a heating portion and a control portion made of a material with a larger resistance-temperature coefficient than that of the material for the heating portion can be made a self-controlling type glow plug exhibiting an excellent temperature-rising characteristics since the heating portion thereof is made of an electrically conductive ceramic material containing $Mo_5Si_3C$ of which the resistance-temperature coefficient is sufficiently reduced.

What is claimed is:

1. An electrically conductive ceramic material containing at least 20% $Mo_5Si_3C$ by weight and having a resistance-temperature coefficient no greater than $5 \times 10^{-4} \deg^{-1}$.

2. A self-controlling type glow plug comprising:
   a heating element made of an electrically conductive ceramic material;
   a resistor for controlling supply of electric current to said heating element and being connected in series to said heating element;
   an electrically conductive ceramic material comprising said heating element containing at least 20% $Mo_5Si_3C$ so that it has a reduced resistance-temperature coefficient of no greater than $5 \times 10^{-4} \deg^{-1}$; and
   said resistor having a larger resistance-temperature coefficient than that of said heating element.

3. An electrically conductive ceramic material which contains at least 8.5 vol % of $Mo_5Si_3C$ based on a total volume of said material.

4. An electrically conductive ceramic material according to claim 3, wherein a remainder of said ceramic material includes an insulating ceramic selected from the group consisting of $Si_3N_4$, $Al_2O_3$, AlN and $ZrO_2$.

5. An electrically conductive ceramic material according to claim 3, said material having a resistance-temperature coefficient of no greater than $5 \times 10^{-4} \deg^{-1}$.

6. A self-controlling type glow plug having a heating element and a resistor for controlling a current flow through said heating element, said heating element being connected in series to said resistor and comprising an electrically conductive ceramic material containing at least 8.5 vol % of $Mo_5Si_3C$ based on a total volume of said material, and said resistor having a higher resistance-temperature coefficient than that of said heating element, said resistance-temperature coefficient of said heating element being no greater than $5 \times 10^{-4} \deg^{-1}$.

7. The self-controlling type glow plug according to claim 6, wherein the remainder of said ceramic material includes an insulating ceramic selected from the group consisting of $Si_3N_4$, $Al_2O_3$, AlN and $ZrO_2$.

8. A process for producing an electrically conductive ceramic material, which comprises the steps of:
   providing a ceramic powder of $Mo_5Si_3$ particles and at least 0.5 wt % of carbon black; and
   firing said powder to produce a ceramic material containing $Mo_5Si_3C$ in sufficient quantity to reduce its resistance-temperature coefficient to no greater $5 \times 10^{-4} \deg^{-1}$.

9. A process as in claim 8, wherein said providing step includes providing sufficient material to form said ceramic material having at least 20 wt % $Mo_5Si_3C$.

10. A process for producing an electrically conductive ceramic material, which comprises the steps of:
    providing a ceramic powder of fine particles of Mo, fine particles of Si and at least 0.5 wt % of carbon black; and
    firing said powder to produce a ceramic material containing $Mo_5Si_3C$ in sufficient quantity to reduce its resistance-temperature coefficient to no greater $5 \times 10^{-4} \deg^{-1}$.

11. A process as in claim 10, wherein said providing step includes providing sufficient material to form said ceramic material having at least 20 wt % $Mo_5Si_3C$.

12. An electrically conductive ceramic material comprising $Si_3N_4$ as an electrically insulative material and at least 20% $Mo_5Si_3C$ based on the weight of the $Si_3N_4$ dispersed therein.

13. A ceramic material according to claim 12 wherein a resistance-temperature coefficient of said material is no greater than $5 \times 10^{-4} \deg^{-1}$.

* * * * *